Oct. 9, 1962 P. PATZ ET AL 3,057,608
GATHERING CHAIN FOR SILO UNLOADERS
Filed Feb. 13, 1961
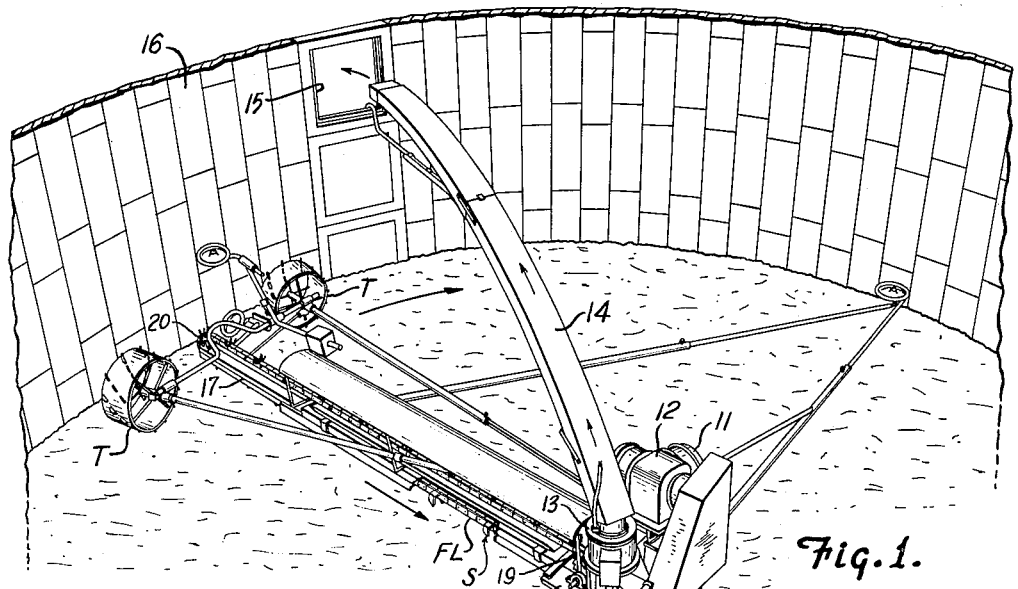
Fig. 1.
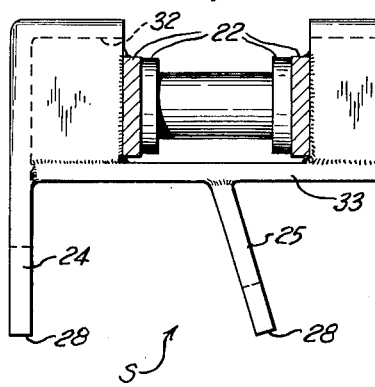
Fig. 2.
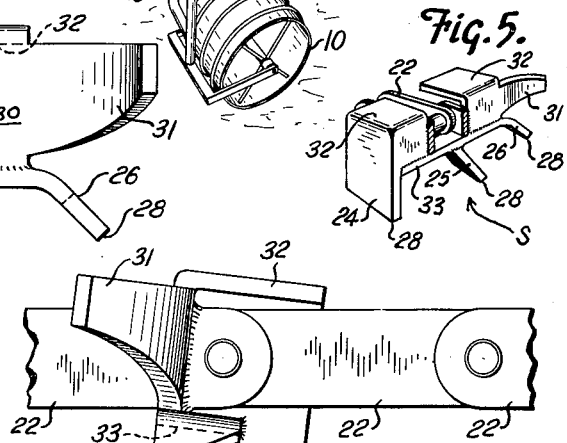
Fig. 3.
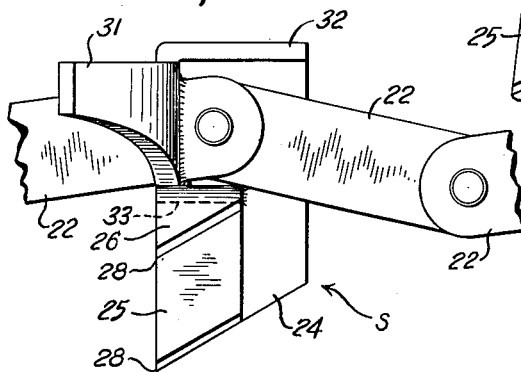
Fig. 4.
Fig. 5.
INVENTORS
P. Patz
E. A. Graetz
BY Lieber, Lieber & Miller
Attorneys /# 3,057,608
Patented Oct. 9, 1962

3,057,608
GATHERING CHAIN FOR SILO UNLOADERS
Paul Patz and Edward A. Graetz, Pound, Wis.
Filed Feb. 13, 1961, Ser. No. 88,834
8 Claims. (Cl. 262—28)

This invention relates generally to silo unloaders of the type in which an endless gathering chain has a lower flight that scrapes the ensilage toward the center of the silo as the unloader revolves around the silo. More particularly, the invention relates to an improved gathering chain for such an unloader.

The gathering chains of unloaders of the above type are subjected to very rough and punishing treatment because the ensilage material must be dug or clawed from the top of the tightly packed mass. Very often some of this material is frozen, particularly around the wall of the silo, or the entire top layer of ensilage may be frozen when left standing for a period of time. As a result, these teeth of the gathering chains are subjected to considerable wear, as is the flexible chain itself to which these teeth are secured.

Furthermore, the particular path of travel of the teeth in relation to the ensilage creates a reaction on the teeth and chain which subjects them to twisting and bending stresses. For example, the teeth not only travel in a forward or inwardly radial direction, but are also pulled sideways as the endless conveyor chain is forcibly revolved around the silo by the traction wheels of the unloader. Thus, the teeth are twisted and pushed sideways at the same time as they must also act to forcibly dig the material loose and pull it inwardly toward the center of the silo. At the same time the chain is subjeced to various tension forces, side thrusts, and also buckling and twisting of the links themselves due to the clawing action of the teeth attached thereto.

It is accordingly an object of the present invention to provide a slio unloader gathering chain which has improved teeth and mounting thereof to the chain, by means of which the ensilage is efficiently and positively removed. The structure is such that the teeth act to progressively dig into the ensilage as they move in their combined forward and sideward movement, and thereby insure the orderly and smooth removal of material from the path of the conveyor. In addition, the links of the chain offer the teeth more rigid support than prior structures, and act to hold the teeth in their most efficient digging position without sacrificing chain flexibility when bent in an opposite direction. The teeth are furthermore mounted on the chain links to keep to a minimum the leverage action of the ensilage on the teeth which tends to buckle-up or twist the chain links; in other words, the line of force created by the digging and conveying action of the teeth is kept as closely as possible coincident with a line extending axially through the working flight of the chain.

These and other objects and advantages of the present invention will appear hereinafter as this disclosure progresses, reference being had to the accompanying drawings, in which:

FIGURE 1 is a perspective view of an ensilage unloader embodying the present invention;

FIGURE 2 is a sectional front elevational view of a portion of the improved gathering chain shown in FIGURE 1 but on an enlarged scale;

FIGURE 3 is a side elevational view of a section of the improved gathering chain;

FIGURE 4 is a view similar to FIGURE 3 but showing the teeth pushed rearwardly where they engage the succeeding link; and FIGURE 5 is a perspective view, on a reduced scale of part of the chain section shown in FIGURES 2, 3 and 4, certain parts being broken away and shown in section for clarity.

Referring in greater detail to the drawings, the silo unloader shown for purposes of illustrating the improved gathering chain includes a main frame F having a pair of large support wheels 10 and 11 and a power unit 12 carried thereon. A blower 13 is also carried by the main frame and has a discharge spout 14 extending therefrom in a relatively fixed radial position for discharging the material out of the outlet 15 of the silo wall 16. A conveyor frame 17 is pivotally connected to the main frame at 18 for swinging about a horizontal axis so that the outer end of the conveyor frame can swing in a vertical direction within predescribed limits. A pair of large traction wheels T are positioned at the outer end of the unloader for revolving the unloader around the silo, maintaining the power unit and blower generally at the vertical axis of the silo.

The conveyor frame has a pair of spaced apart sprockets 19 and 20 rotatably mounted thereon, the rear sprocket 19 being driven and the outer sprocket 20 being located closely adjacent the silo wall.

The structure heretofore described is more or less conventional and if further reference to this structure or its operation is deemed necessary or desirable, reference may be had to the copending application, Serial No. 831,362 filed August 3, 1959, now issued as U.S. Patent No. 3,013,674 which issued on December 19, 1961, and entitled "Silage Unloading Mechanism."

The improved conveyor chain which is provided by the present invention will now be described. This chain consists of an endless flexible member which is trained over the sprockets and driven thereby. This endless member or chain has a lower flight FL which is driven in a direction toward the center of the silo and thereby acts to scrape and dig the ensilage which it passes over and move it in a forward or radially inward direction and into the blower 13. Simultaneously with the radial inward movement of the lower flight, it is also revolved around the silo. Thus the lower flight is subjected to a combined movement which is in a forward direction toward the center of the silo and also a sideways direction as it revolves about the silo. In other words, in addition to the forward movement of the lower flight, it is also subjected to a sideways thrust.

The endless chain proper is comprised of a series of links 22 which are pivotally connected together by pins 23.

Secured along the length of the endless chain at spaced locations are a series of sets of teeth S. These sets of teeth are secured as by welding to certain of the links 22. These sets of teeth are fabricated as a weldment but of course could be formed as a casting or in other diverse ways. In the embodiment shown, however, these sets include three generally downwardly extending teeth 24, 25 and 26 and it will be noted that the front tooth 26 is the shortest of the three. This tooth 26 is located on the forward side of the set of teeth in respect to the direction in which the conveyor is revolved around the silo. It will also be noted that the teeth 25 and 26 are both inclined at an angle in this same direction. It should furthermore be noted that all of the teeth have their rear lower sides cut at an incline to provide a rearward rake in the direction away from the center of the silo. In other words, a rather sharp pointed leading edge 28 is provided for all of the teeth.

Obviously, other numbers of teeth may be employed and it is not essential to this invention that each succeeding tooth of any set is of greater length than its preceding tooth. Generally, however, the teeth may become progressively longer in a direction opposite to that in which they are revolved around the silo.

The sets of teeth of the lower flight extend in a generally vertical direction and also each includes a plate-like portion 30 which embraces the respective link to which they are attached by welding. Referring to FIGURE 3, it will be noted that the general attitude of the set of teeth in respect to the link is in an inclined position—that is, inclined rearwardly and upwardly in respect to the direction of travel as it moves towards the center of the silo. The plate-like portion 30 includes a forwardly curved wing 31 which together wtih the plate 30 acts to engage the material loosened by the teeth and push it forwardly as the flight of the chain travels over the ensilage. The sets of teeth may also include an upper rearwardly extending reinforcing flange 32, which flange may be formed integrally with the plate-like portion and may be formed simply by turning the plate-like portion rearwardly along its upper edge. The large rear tooth 24 may be welded along its upper end to the rearwardly extending flange 32 to thus form a very rigid structure which will not be bent in operation and which will forcibly dig the hard material for conveyance by the endless chain.

Means are also provided on the sets of teeth for limiting their extent of rearward swinging while in operation so that they maintain their proper digging position. Referring more specifically to FIGURE 3, it will be seen that a transversely extending part 33 is located adjacent the lower edge of its respective link. In FIGURE 4 the teeth have been shown in the position they occupy when they are acting to forcibly loosen the material. In this position the teeth have generally been tipped rearwardly so that the part 33 is engaged by the underside of the succeeding link. In this manner the succeeding link acts to hold the teeth in a digging position and prevent them from being rotated rearwardly at their lower side beyond a predetermined position. Thus the manner in which the sets of teeth are secured to their link and their relationship with the succeeding link provides a rigid lower flight of the gathering chain when in operation. It will be noted, however, that the links are free to rotate a considerable distance in the other direction relative to one another because of the cut-away portion 34 in the flange 32.

In operation, the lower flight is simultaneously moved forwardly in a radially inward direction and is also revolved around the silo. The resulting path for the teeth in respect to the ensilage is generally in a spiral direction around the silo. Because the teeth of each set are progressively shorter in length in the direction in which they are revolved around the silo, they act to progressively remove the material over which the teeth pass, rather than taking a large bite into the ensilage with a resulting shock load. Instead they tend to chew the material off the top layer of the ensilage as they pass thereover. The rearwardly inclined rake of the teeth and their pointed leading edge act to effectively dig into the hard material and loosen it sufficiently so that it may be conveyed or pushed by the other portion of the set of teeth.

The leverage action of the lower end of the teeth on the ensilage is minimized and rearward twisting of the sets of teeth and their links is minimized. In other words, the distance between the lower end of the teeth and the line of force which normally extends axially through the links is kept to a minimum consonant with good digging and conveying action. The plate-like portion of the sets of teeth which actually serve to push the material forwardly is located generally in line with the links themselves.

By means of the present invention the twisting or buckling action on the teeth and on the chain itself are held to a minimum as the lower flight of the gathering chain is subjected to a combined forward and sideward movement over the ensilage which it must dig and convey. Any material moved for one pass of the flight is loosened in a more or less progressive and smooth manner because of the shape and position of the teeth. The structure of the sets of teeth and their mounting on the links provide a particularly efficient means for positively removing ensilage.

Various modes of carrying out the invention are contemplated as being within the scope of the following claims particularly pointing out and distinctly claiming the subject matter which is regarded as the invention.

What is claimed and desired to be secured by Letters Patent is:

1. An endless gathering chain for being revolved around a silo by a silo unloader comprising, a flexible endless chain having a series of links pivotally connected together, and sets of teeth secured to some of said links and at spaced locations along the length of said chain, each set of teeth comprising, mounting means including a vertically and transversely arranged pusher plate welded to one of said links so that the latter is contained within the height of said vertical plate, and a plurality of downwardly extending teeth secured at their upper ends to said mounting means and arranged generally transversely across said chain, the front tooth in respect to the direction in which said chain is being revolved around said silo being shorter than the trailing tooth.

2. An endless gathering chain for being revolved around a silo by a silo unloader comprising, a flexible endless chain having a series of links pivotally connected together, and sets of teeth secured to some of said links and at spaced locations along the length of said chain, each set of teeth comprising, mounting means including a vertically and transversely arranged pusher plate welded to one of said links so that the latter is contained within the height of said vertical plate, and a plurality of downwardly extending teeth secured at their upper ends to said mounting means and arranged generally transversely across said chain, said pusher plate having a forwardly curved wing at one end which together with said plate acts to push the material loosened by the teeth.

3. An endless gathering chain for being revolved around a silo by a silo unloader comprising, a flexible endless chain having a series of links pivotally connected together, and sets of teeth secured to some of said links and at spaced locations along the length of said chain, each set of teeth comprising, mounting means including a vertically and transversely arranged pusher plate welded to one of said links so that the latter is contained within the height of said vertical plate, and a plurality of downwardly extending teeth secured at their upper ends to said mounting means and arranged generally transversely across said chain, said pusher plate having a forwardly curved wing at one end which together with said plate acts to push the material loosened by the teeth, the front tooth in respect to the direction in which said chain is being revolved around said silo being shorter than the trailing tooth.

4. An endless gathering chain for being revolved around a silo by a silo unloader comprising, a flexible endless chain having a series of links pivotally connected together, and sets of teeth secured to some of said links and at spaced locations along the length of said chain, each set of teeth comprising, mounting means including a vertically and transversely arranged pusher plate welded to one of said links so that the latter is contained within the height of said vertical plate, and a plurality of downwardly extending teeth secured at their upper ends to said mounting means and arranged generally transversely across said chain, the front tooth in respect to the direction in which said chain is being revolved around said silo being shorter than the trailing tooth, said mounting means also having a part which bears against an immediately succeeding link when said set is pushed to a predetermined rearward position to maintain said teeth substantially vertical.

5. An endless gathering chain for being revolved around a silo by a silo unloader comprising, a flexible endless chain having a series of links pivotally connected together, and sets of teeth secured to some of said links and at spaced locations along the length of said chain, each set of teeth comprising, mounting means including a vertically and transversely arranged pusher plate welded to one of said links so that the latter is contained within the height of said vertical plate, and a plurality of downwardly extending teeth secured at their upper ends to said mounting means and arranged generally transversely across said chain, said pusher plate having a forwardly curved wing at one end which together with said plate acts to push the material loosened by the teeth, the front tooth in respect to the direction in which said chain is being revolved around said silo being shorter than the trailing tooth, said mounting means also having a part which bears against an immediately succeeding link when said set is pushed to a pre-determined rearward position to maintain said teeth substantially vertical.

6. An endless gathering chain for being revolved around a silo by a silo unloader comprising, a flexible endless chain having a series of links pivotally connected together, and sets of teeth secured to some of said links and at spaced locations along the length of said chain, each set of teeth comprising, mounting means including a vertically and transversely arranged pusher plate welded to one of said links so that the latter is contained within the height of said vertical plate, said mounting means also including a rearwardly extending reinforcing flange secured along the top edge of said vertical pusher plate, and a plurality of downwardly extending teeth secured at their upper ends to said mounting means and arranged generally transversely across said chain, the front tooth in respect to the direction in which said chain is being revolved around said silo being shorter than the trailing tooth.

7. An endless gatherng chain for being revolved around a silo by a silo unloader comprising, a flexible endless chain having a series of links pivotally connected together, and sets of teeth secured to some of said links and at spaced locations along the length of said chain, each set of teeth comprising, mounting means including a vertically and transversely arranged pusher plate welded to one of said links so that the latter is contained within the height of said vertical plate, said mounting means also including a rearwardly extending reinforcing flange secured along the top edge of said vertical pusher plate, and a plurality of downwardly extending teeth secured at their upper ends to said mounting means and arranged generally transversely across said chain, said pusher plate having a forwardly curved wing at one end which together with said plate acts to push the material loosened by the teeth, the front tooth in respect to the direction in which said chain is being revolved around said silo being shorter than the trailing tooth.

8. An endless gathering chain for being revolved around a silo by a silo unloader comprising, a flexible endless chain having a series of links pivotally connected together, and sets of teeth secured to some of said links and at spaced locations along the length of said chain, each set of teeth comprising, mounting means including a vertically and transversely arranged pusher plate welded to one of said links so that the latter is contained within the height of said vertical plate, said mounting means also including a rearwardly extending reinforcing flange secured along the top edge of said vertical pusher plate, and a plurality of downwardly extending teeth secured at their upper ends to said mounting means and arranged generally transversely across said chain, said pusher plate having a forwardly curved wing at one end which together with said plate acts to push the material loosened by the teeth, the front tooth in respect to the direction in which said chain is being revolved around said silo being shorter than the trailing tooth, said mounting means also having a part which bears against an immediately succeeding link when said set is pushed to a pre-determined rearward position to maintain said teeth substantially vertical.

References Cited in the file of this patent

UNITED STATES PATENTS

| | | |
|---|---|---|
| 2,636,291 | Reagle | Apr. 28, 1953 |
| 2,711,834 | Broberg et al. | June 28, 1955 |
| 2,756,112 | Knutson | July 24, 1956 |
| 3,006 087 | Lindell | Oct. 31, 1961 |